United States Patent [19]
Kochendorfer et al.

[11] 4,406,558
[45] Sep. 27, 1983

[54] GUDGEON PIN

[76] Inventors: Richard Kochendorfer, Silberwaldstrasse 1, 7000 Stuttgart 75; Helmut Krauss, Stuifenstrasse 8, 7252 Weil der Stadt 5, both of Fed. Rep. of Germany

[21] Appl. No.: 216,979

[22] Filed: Dec. 16, 1980

[30] Foreign Application Priority Data

Dec. 22, 1979 [DE] Fed. Rep. of Germany ....... 2952117

[51] Int. Cl.³ .................. G05G 1/00; F16D 1/00; F16D 1/12; F16J 1/38
[52] U.S. Cl. .................. 403/151; 74/579 R; 74/579 E; 403/150; 403/228
[58] Field of Search .............. 74/579 R, 579 E; 92/187, 212, 222, 248; 308/23, 237 R; 403/150-152, 228

[56] References Cited

U.S. PATENT DOCUMENTS

| | | | |
|---|---|---|---|
| 2,422,327 | 6/1947 | Winslow | 403/152 |
| 2,886,034 | 5/1959 | Robinson et al. | 128/218 |
| 3,171,699 | 3/1965 | Maxey | 308/26 |
| 3,172,797 | 3/1965 | Bungardt | 308/237 |
| 3,519,260 | 7/1970 | Irwin | 308/237 R |
| 3,575,089 | 4/1971 | Smith | 92/187 |
| 3,709,797 | 1/1973 | Stobo | 308/237 R |
| 4,216,682 | 8/1980 | Ban et al. | 74/579 E |
| 4,311,406 | 1/1982 | Driver | 403/161 |

*Primary Examiner*—Leslie A. Braun
*Assistant Examiner*—L. D. Shannon, III
*Attorney, Agent, or Firm*—Laubsher, Philpitt & Laubscher

[57] ABSTRACT

A device, such as a gudgeon pin, for connecting a piston of a reciprocating internal combustion agent to a connecting-rod comprises at least in part a fibre-reinforced composite material. The device further comprises a metallic sliding bearing having a circular cylindrical external surface. The sliding bearing layer is arranged on the external surface of the fibre-reinforced composite material. A plurality of fibre layers, which run in differing directions, are arranged in the composite material, and the sliding bearing layer is divided in the transition region from a piston to a connecting-rod. The gudgeon pin has alternate layers, in which fibres are arranged orthogonally to fibres in an adjacent fibre layer. The fibres run parallel to the gudgeon pin axis in one layer and orthogonally thereto in the two adjacent layers. The composite material layer has on its exterior a metallic sliding bearing layer which is applied either by electro-plating or by vapour deposition, or a sliding bearing bush is slipped over the composite material layer.

19 Claims, 6 Drawing Figures

U.S. Patent  Sep. 27, 1983  Sheet 1 of 2  4,406,558
FIG. 1
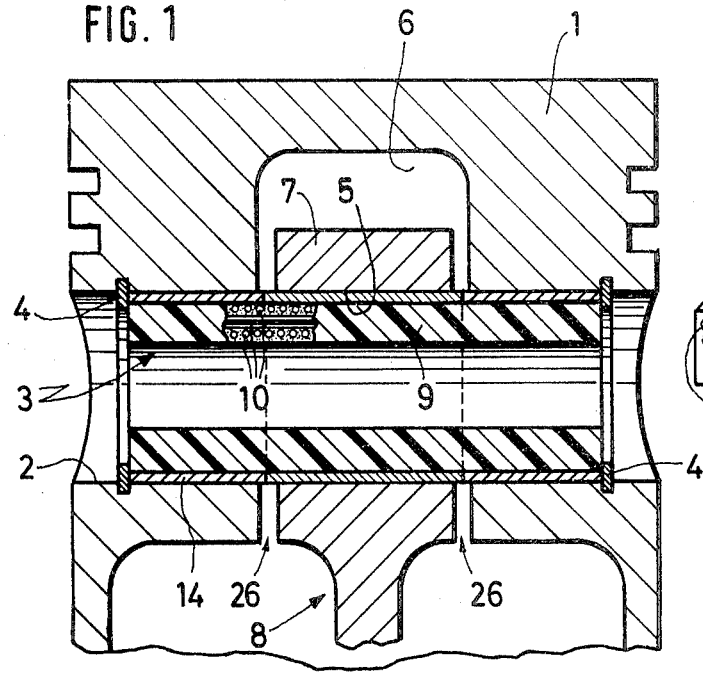
FIG. 2
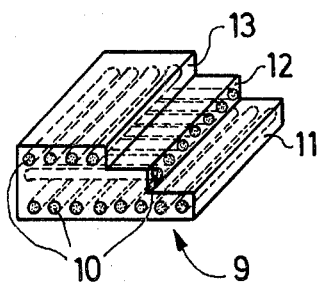
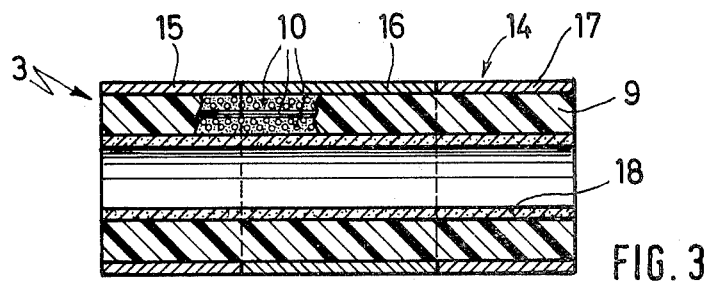
FIG. 3
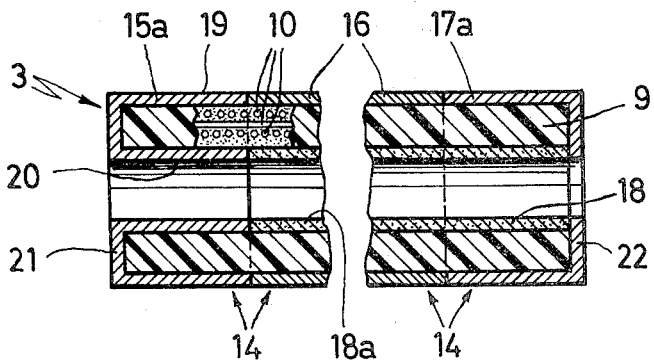
FIG. 4

GUDGEON PIN

BACKGROUND OF THE INVENTION

The invention relates to a gudgeon pin for connecting a piston of a reciprocating internal combustion engine to a connecting-rod, composed at least in part of a fibre-reinforced composite material, and a metallic sliding bearing layer having a circular cylindrical external surface being arranged on the external surface of the fibre-reinforced composite material.

In reciprocating internal combustion engine, in particular in Otto and diesel engines, the piston and the connecting-rod are joined together by means of a gudgeon pin. This gudgeon pin transmits the forces of combustion and compression and the dynamic forces from the piston to the connecting-rod and thus to the crank shaft of the reciprocating internal combustion engine. The gudgeon pin is rotatably inserted into a bore in the connecting-rod and into a continuous bore in the piston and is secured against axial displacement by suitable means, for example by a Seeger circlip ring.

The forces acting on the gudgeon pin deform it and cause, on the one hand, bending of the pin axis and, on the other hand, ovalisation of and shear stress on the cross-section of the pin. These deformations should be minimal.

BRIEF DESCRIPTION OF THE PRIOR ART

In order to minimize pin deformation, it is known to use a hollow-bored steel gudgeon pin having a variable pin wall thickness, the pin wall thickness being adapted to the differing surface pressures (German Offenlegungsschrift No. 24 55 750).

For reducing the dynamic stress of the gudgeon pin, it is also known to use a relatively small-sized hollow gudgeon pin which only has to transmit the centrifugal forces as the gas forces are conveyed mainly by means of the end of the connecting-rod designed as a partial spherical surface (German Offenlegungsschrift No. 27 37 596).

In all the formerly known designs, it was necessary to produce the gudgeon pin from metal, preferably from steel. This necessarily led to gudgeon pins of high mass which produced high dynamic stresses, for example on the connecting-rod and crank shaft.

In a known gudgeon pin design, (British Pat. No. 905 638), the gudgeon pin is surrounded by an elastic layer which should help to dampen the piston bearing. The gudgeon pin itself consists, in the conventional way, of a hollow metal cylinder whose wall thickness does not change over the entire length. The problems of strength described above therefore also arise with this known gudgeon pin.

It is also known to embed axially parallel steel threads (French Pat. No. 540 514) in light metal gudgeon pins. Although the properties of strength of such a gudgeon pin can be improved in this way, the problem of material breakages in the region subjected to the greatest stress, which is in the transition region from the gudgeon pin bearing to the connecting-rod, arises as the axial rigidity of the material produced by the steel wires cannot produce the desired increase in the strength of the gudgeon pin in this region.

The object of the invention is to develop a gudgeon pin of this type in such a way that equally good or better properties of strength can be achieved with gudgeon pins having a relatively small mass than with gudgeon pins of the known type.

SUMMARY OF THE INVENTION

According to the invention, a gudgeon pin for connecting a piston of a reciprocating internal combustion engine to a connecting-rod is disclosed, the device comprising at least in part a fibre reinforced composite material, a metallic sliding bearing layer having a circular cylindrical external surface, the sliding bearing layer being arranged on the external surface of the fibre-reinforced composite material, wherein a plurality of fibre layers running in differing directions are arranged in the composite material, and the sliding bearing layer is divided in the transition region from a piston to a connecting-rod.

In this arrangement, it is important to avoid both the bending of the gudgeon pin and the ovalization of the gudgeon pin by means of the reinforcing fibres running in differing directions. The division of the sliding bearing layer in the regions of maximum mechanical deformation also proposed allows over-stressing of the sliding bearing layer and the breakage thereof to be avoided. It is possible to divide the sliding bearing layer because the sliding bearing layer itself contributes to the strength of the pin only to an insignificant extent, the strength of the gudgeon pin being produced essentially by the fibre layers running in differing directions.

The insertion of fabric-type material is known per se, for example, in brake blocks and clutch linings (German Pat. No. 98 568 and German Auslegeschrift No. 1 600 043). Fabric-type reinforcements are inserted in these parts, which are exposed to wear, essentially to reduce the extent to which they waste away. With the gudgeon pin according to the invention, however, the object of embedding fibres is to increase the deformation resistance of the gudgeon pin, in particular, to reduce the ovalisation and bending.

In a preferred embodiment, the fibres can be embedded in synthetic plastics material, in particular in high temperature-resistant modifications of the duromers, epoxide, polyester or polyamide or in high temperature-resistant thermoplastics such as polycarbonates or polysulphones.

To produce the sliding bearing layer, the gudgeon pin is preferably metallised. With gudgeon pins, it is already known per se to provide a coating composed of a hard nitride, boride and/or silicide of the metals in the third to sixth group of the periodic table at the sliding points (published German Patent Application M 20 813).

In a particularly preferred embodiment, it is proposed that the sliding bearing layer consist of a central cylindrical sleeve and of two cylindrical caps which are connected to the cylindrical sleeve on opposite sides and cover at least the end faces of the fibre-reinforced gudgeon pin.

Several fibre layers running in differing directions are arranged in the composite material. An arrangement is particularly advantageous in which fibre layers, having fibres arranged parallel to the gudgeon pin axis, alternate with fibre layers, having fibres arranged orthogonally to the gudgeon pin axis in a circumferential direction. While the fibres running parallel to the gudgeon pin axis reduce the bending of the gudgeon pin, the fibre layers running in the circumferential direction restrict the ovalisation of the gudgeon pin.

The following fibres are particularly suitable for making up a gudgeon pin: carbon fibres, glass fibres, synthetic fibres (aramide fibres), boron fibres, $Al_2O_3$ fibres or silicon carbide fibres.

Boron fibres which are coated with silicon carbide or $B_4C$ are also desirable for this purpose.

In a first embodiment of the invention it is proposed that the fibres be embedded in light metal, such as aluminium or titanium.

In other preferred cases, the fibres are embedded in synthetic plastics material, in particular in high temperature-resistant modifications of the duromers epoxide, polyester or polyamide or in high temperature-resistant thermoplastics such as polycarbonates or polysulphones.

A metallic sliding bearing layer having a circular cylindrical external surface is preferably arranged on the external surface of the fibre-reinforced composite material. This sliding bearing layer forms, together with a corresponding bearing dish in the piston bore, a sliding bearing for the piston. The materials can be selected in the manner conventional with sliding bearings i.e. one of the layers is generally composed of a softer metal and the other of a harder metal. Since the properties of strength and rigidity of the gudgeon pin according to the invention are determined by the fibre-reinforced composite material, the sliding bearing layer of the gudgeon pin can also be composed of a soft metal, i.e. the material for the sliding bearing layer can be selected freely and need not possess properties to increase the strength of the gudgeon pin as in the case of known gudgeon pins composed of steel and the like. It is thus possible to select the combination of materials which is most desirable for the bearing, particularly since variation in the composition of the composite material permits the co-efficient of thermal expansion of the composite fibre material to be adapted, for example, to that of the sliding bearing material.

The bearing layer can be formed by an outer circular cylindrical bearing sleeve made of metal which surrounds the fibre-reinforced composite material, but it is also possible to metallise the composite material, for example by electro-plating or by vapour deposition.

It is proposed that the sliding bearing layer be divided in the transition region from the piston to the connecting-rod. The greatest differences in the mechanical deformation of the composite material and the bearing layer occur in this region. By dividing the sliding bearing layer in this region, the over-stressing thereof is avoided. As the sliding bearing layer itself only contributes to the strength of the pin to an insignificant extent, the division has virtually no influence on the mechanical properties of the gudgeon pin.

The fibre-reinforced composite material can fill out the entire internal space of the sliding bearing layer, but a design is preferred in which the composite material forms a cylindrical layer which is arranged co-axially to the gudgeon pin axis and surrounds a continuous internal space.

In order to protect the fibre-reinforced composite material from the corrosive media surrounding it, it is also advantageous to provide the composite material on its internal surface with an essentially impermeable layer facing the internal space and/or on its end faces. This impermeable layer can preferably comprise plastic or metal.

For example, the impermeable layer can be formed by a tubular sleeve in the interior of the gudgeon pin.

In a preferred embodiment of the invention, it is proposed that the tubular sleeve has at one end a flange covering the end face of the composite material layer and that the cylindrical bearing layer also has, at the opposite end of the gudgeon pin, a corresponding flange covering the opposite end face of the gudgeon pin.

It is desirable for the bearing layer to consist of a central cylindrical sleeve and of two cylindrical caps which are connected to the cylindrical sleeve on opposite sides and cover at least the end faces of the fibre-reinforced gudgeon pin.

The caps preferably consist of two co-axially arranged circular cylinders which are joined together by means of an annular end wall. The fibre-reinforced composite material is arranged in the annular gap between the circular cylinders.

It is particularly advantageous if the fibre content in the composite material is at least 60% by volume.

Owing to the lower density of the materials used for the composite material, the mass of the gudgeon pin can be reduced by about 50% relative to the formerly known steel pins while maintaining high rigidity and/or strength. The smaller mass of the gudgeon pin leads to a reduction in the dynamic stresses on the connecting-rod and crank shaft. These components can therefore also be correspondingly lighter in design so that the total mass of the engine is reduced significantly. Moreover, composite fibre materials also have a good dynamic loading capacity, a small tear propagation rate and a low notch sensitivity. The quiet running of the engine is increased by these factors and by the generally much higher damping effected by the composite fibre materials.

BRIEF DESCRIPTION OF THE FIGURES

The following description of preferred embodiments of the invention will serve as a further explanation in conjunction with the drawings, in which FIG. 1 shows a longitudinal sectional view of a gudgeon pin according to the invention joining a connecting-rod and a piston to each other;

FIG. 2 shows a magnified view of the direction of the fibres in the gudgeon pin in FIG. 1;

FIG. 3 shows a longitudinal sectional view of another embodiment of a gudgeon pin according to the invention;

FIG. 4 shows a longitudinal sectional view of two other embodiments of a gudgeon pin according to the invention;

DETAILED DESCRIPTION

Figure 5:
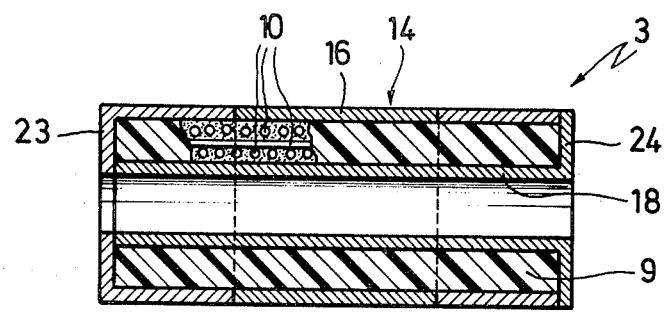
FIG. 5 shows a longitudinal section through another embodiment of a gudgeon pin according to the invention.

A gudgeon pin 3 is rotatably mounted in a continuous bore 2 in a piston 1, shown only in part in FIG. 1. To secure the gudgeon pin against axial displacement, the gudgeon pin 3 has at each end a shaft locking ring 4 which engages in a corresponding groove in the bore 2.

The gudgeon pin 3 is pushed through a bore 5 in the end of a connecting-rod 8 which is not shown completely in FIG. 1 and whose end is thus mounted in the hollow internal space 6 in the piston 1.

The gudgeon pin 3 consists of a circular cylinder-shaped layer 9 of a composite material in which fibres 10 are embedded for reinforcement in an arrangement of the type shown in the magnified view in FIG. 2. FIG.

2 shows alternate layers 11, 12, 13 in which the fibres 10 are arranged orthogonally to fibres in an adjacent layer. As shown in the illustration in FIG. 1, the fibres 10 run parallel to the gudgeon pin axis in one layer and orthogonally thereto in the two adjacent layers.

The composite material layer 9 has on its exterior a metallic sliding bearing layer 14 which is applied either by electro-plating or by vapour deposition, or a sliding bearing bush is slipped over the composite material layer 9.

The sliding bearing layer is divided into three adjacent segments. The dividing line is in the region between the internal piston wall on the one hand and the connecting-rod end on the other hand.

Various metals having desirable sliding bearing properties can be used for the production of the sliding bearing layer 14, the selection being made according to the material structure of the internal wall of the bore 2. If this internal wall is hard, a soft material is used for the sliding bearing layer, but if the internal wall consists of soft material, the sliding bearing layer will be produced from a hard metal.

In the gudgeon pin shown in FIG. 1, the composite material layer 9 is freely accessible from the end faces and from the interior, i.e. it makes direct contact with the lubricant.

The gudgeon pin shown in FIG. 3 is constructed in a similar manner to the one shown in FIG. 1. A circular cylindrical composite material layer 9 with crossing fibre layers has on its exterior a sliding bearing layer 14 which, as in the embodiment in FIG. 1, is divided in the region 26 between the internal piston wall on the one hand and the connecting rod end on the other hand, so that three circular cylindrical segments 15, 16 and 17 are arranged next to each other on the circular cylindrical fibre-reinforced composite material core. As the composite material and the sliding bearing layer experience differing deformations in the region 26 during operation, there is a risk of damaging the sliding bearing layer if it is continuous in design. The intentional division of the sliding bearing layer in the region 26 between the piston and the connecting rod end prevents such damage.

In the example shown in FIG. 3, the circular cylindrical composite material core is also provided on its internal wall with an impermeable layer 18 which can comprise metal or a suitable temperature-resistant and oil-resistant plastics material. This layer can be, for example, a bush which is inserted into the interior of the composite material core or a layer of polytetrafluoroethylene.

FIG. 4 shows two possible variations of the gudgeon pin shown in FIG. 3. On the left-hand side, an end segment 15a of the slidng bearing layer 14 is designed as a cap consisting of two concentrically arranged cylinders 19 and 20 which are joined together by means of an annular end wall 21. The cap 15a of this type is slipped from both ends on to the composite material core, the outer cylinder 19 forming the sliding bearing layer while the inner cylinder 20 and the end wall 21 serve to protect the fibre-reinforced composite material from oil. In the region between the two caps 15a, the composite material core has a cylindrical sliding bearing segment 16 on its exterior, like the gudgeon pin in FIG. 3, and a cylindrical impermeable layer 18a on its interior.

The embodiment shown in the right-hand section of FIG. 4 differs from the embodiment in the left-hand section merely in that a cap 17a consists of the cylindrical segment 17 and an end wall 22 covering the end face of the composite material core, whereas the entire internal wall of the composite material core is covered by an impermeable layer 18 extending over the entire length.

In the embodiment shown in FIG. 5, whose composite material core is preferably constructed in the same manner as in the previously described embodiments, the sliding bearing layer 14 has an end wall 23 covering the composite material core at one end face, while the impermeable layer 18 has at the opposite end an annular flange 24 which covers the opposite end face of the composite material core. The sliding bearing layer 14 is divided in this embodiment in the same manner as that shown in FIGS. 3 and 4.

Figure 6:
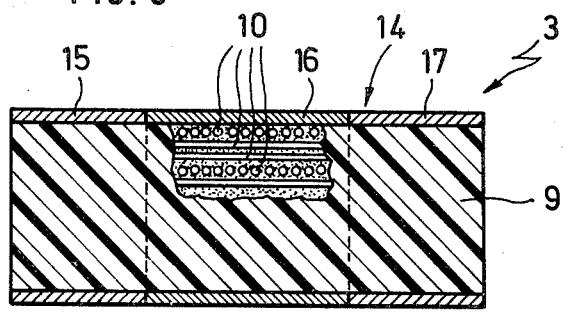
FIG. 6 shows a longitudinal sectional view of another embodiment of a gudgeon pin according to the invention.

Whereas all gudgeon pins described hitherto have a continuous internal bore, the gudgeon pin illustrated in FIG. 6 is solid in design. In this gudgeon pin, layers with fibres running parallel to the gudgeon pin longitudinal axis in a radial direction alternate with fibres running orthogonally to the gudgeon pin longitudinal axis in a circumferential direction. As in the formerly described gudgeon pins, this solid gudgeon pin has a divided sliding bearing layer on its exterior.

The reinforcing fibres can be of a differing nature in all embodiments described, and it is particularly advantageous to use glass fibres, carbon fibres, synthetic fibres (aramide fibres), aluminium oxide fibres as well as silicon carbide fibres and boron fibres, the latter advantageously being coated with silicon carbide or with $B_4C$, particularly if embedded in metal. The first-mentioned fibres have diameters of the order of $10\mu$, while boron fibres and silicon carbide fibres generally have diameters exceeding $100\mu$.

Fibres of the type described can be embedded in various materials, for example in light metals such as aluminium or titanium or in special plastics, for example high temperature-resistant modifications of the duromers epoxide, polyester or polyamide or high temperature-resistant thermoplastics such as polycarbonate or polysulphones.

Particularly advantageous combinations are produced by inserting boron fibres or silicon carbide fibres in aluminium, and by inserting carbon fibres in plastics.

It is desirable for the fibre content of the composite material to be at least 60% by volume.

An impermeable protective layer on the interior and/or the end faces of the composite material can be dispensed with if the composite material is resistant to corrosive media such as oil or impurities therein, for example when using a fibre-reinforced light metal.

The combinations of material described above permit the dynamic stress on connecting-rods and crank shafts to be reduced when using fibre-reinforcing materials with densities of between 1.5 and 2.7 $g/cm^3$ and the fibre content of about 60% by volume as the reduction in mass amounts to up to 50% and higher relative to conventional steel designs.

It is also pointed out that the production techniques needed for producing pins from fibre-reinforced materials are known per se and are not described specially.

We claim:

1. Apparatus for connecting a reciprocating piston of an internal combustion engine to a connecting rod, comprising
    (a) a generally cylindrical member (9) having a longitudinal axis, said member being formed of composite material and including a plurality of concentric layers of reinforcing fibers, the fibers of successive layers extending in different directions; and (b) generally tubular segmented sliding bearing means (14) arranged concentrically about the external surface of said cylindrical member, said sliding bearing means including a plurality of discreet metallic tubular segments (15, 16, 17) arranged in contiguous end-to-end relation, thereby to accomodate deformations in said bearing means in the region of support between the piston and the connecting rod during operation of the internal combustion engine.

2. Apparatus as defined in claim 1, wherein the fibers of at least one of said layers of fibers extend parallel to said longitudinal axis.

3. Apparatus as defined in claim 2, wherein the fibers of alternative layers of said layers of fibers extend orthogonally relative to and circumferentially about said longitudinal axis, and further wherein the fibers of the remaining layers of fibers extend parallel to said longitudinal axis.

4. Apparatus as defined in any of claims 1 to 3, wherein said fibers are selected from the group consisting of carbon fibers, glass fibers, synthetic fibers, boron fibers, aluminum oxide fibers and silicon carbide fibers.

5. Apparatus as defined in claim 4, wherein said boron fibers are coated with silicon carbide.

6. Apparatus as defined in claim 4, wherein said boron fibers are coated with $B_4C$.

7. Apparatus as defined in any one of claims 1 to 3, wherein said fibers are embedded in a light metal.

8. Apparatus as defined in any one of claims 1 to 3, wherein said fibers are embedded in synthetic plastic material.

9. Apparatus as defined in any one of claims 1 to 3, wherein said fibers comprise at least 60% of the volume of said cylindrical member.

10. Apparatus as defined in any one of claims 1 to 3, wherein said device is metallized.

11. Apparatus as defined in any one of claims 1 to 3, wherein said sliding bearing means is hollow, and further wherein said cylindrical member completely fills the interior of said bearing means.

12. Apparatus as defined in claim 1, wherein said cylindrical member contains a longitudinal through-bore.

13. Apparatus as defined in claim 12, and further comprising a generally cylindrical layer of impermeable material (18) arranged adjacent the inner cylindrical surface of said cylindrical member.

14. Apparatus as defined in claim 13, wherein said impermeable material comprises synthetic plastic material.

15. Apparatus as defined in claim 13, wherein said impermeable material comprises metal.

16. Apparatus as defined in any one of claims 13, 14, or 15, wherein said layer of impermeable material comprises a tubular sleeve.

17. Apparatus as defined in claim 16, wherein said tubular sleeve includes a flange (24) which extends radially outwardly from one end of said longitudinal through-bore to cover one end face of said member and said bearing sleeve means, and further wherein said bearing sleeve means extends radially inwardly to cover the opposite end of said member and said impermeable layer.

18. Apparatus as defined in claim 1, wherein said bearing sleeve means comprise a central segment and a pair of end cap segments (15a, 17a) being adapted to cover at least the end face portions of said cylindrical member.

19. Apparatus as defined in claim 18, wherein said end cap segments each comprise two coaxially arranged cylindrical portions and an annular end wall joining one end of said cylindrical portions, thereby to define an annular recess adapted to receive the end portion of said cylindrical member.

* * * * *